US007693905B2

(12) United States Patent
Wyman

(10) Patent No.: US 7,693,905 B2
(45) Date of Patent: Apr. 6, 2010

(54) SYSTEM AND METHOD FOR OPTIMIZING EVENT PREDICATE PROCESSING

(75) Inventor: Robert Mark Wyman, New York, NY (US)

(73) Assignee: Technology Financial, LLC, Bow, WA (US)

( * ) Notice: Subject to any disclaimer, the term of this patent is extended or adjusted under 35 U.S.C. 154(b) by 947 days.

(21) Appl. No.: 11/479,965

(22) Filed: Jun. 30, 2006
(Under 37 CFR 1.47)

(65) Prior Publication Data

US 2007/0043711 A1 Feb. 22, 2007

Related U.S. Application Data

(60) Provisional application No. 60/695,552, filed on Jun. 30, 2005.

(51) Int. Cl.
*G06F 17/30* (2006.01)

(52) U.S. Cl. ....................... 707/748; 707/752; 709/206; 709/217

(58) Field of Classification Search ..................... 707/2, 707/10, 102, 3, 6, 7, 803; 704/8; 709/203, 709/206, 217; 715/201
See application file for complete search history.

(56) References Cited

U.S. PATENT DOCUMENTS

| | | | | |
|---|---|---|---|---|
| 4,864,502 | A * | 9/1989 | Kucera et al. | 704/8 |
| 5,664,172 | A * | 9/1997 | Antoshenkov | 707/4 |
| 5,706,495 | A * | 1/1998 | Chadha et al. | 707/2 |
| 6,564,212 | B2 * | 5/2003 | Koskas | 707/3 |
| 6,728,715 | B1 * | 4/2004 | Astley et al. | 707/10 |
| 6,925,457 | B2 * | 8/2005 | Britton et al. | 707/1 |
| 7,136,899 | B1 * | 11/2006 | Campailla | 709/206 |
| 7,162,467 | B2 * | 1/2007 | Eshleman et al. | 707/3 |
| 7,200,675 | B2 * | 4/2007 | Wang et al. | 709/238 |
| 7,313,554 | B2 * | 12/2007 | Chen et al. | 707/3 |
| 2004/0181588 | A1 * | 9/2004 | Wang et al. | 709/207 |
| 2005/0071322 | A1 * | 3/2005 | Chen et al. | 707/3 |
| 2006/0059165 | A1 * | 3/2006 | Bosloy et al. | 707/10 |

OTHER PUBLICATIONS

PCT/US05/47078, International Filing date Dec. 23, 2005, Form PCT/ISA/210, 220, 237.*

* cited by examiner

*Primary Examiner*—Shahid A Alam
(74) *Attorney, Agent, or Firm*—Fay Kaplun & Marcin, LLP

(57) ABSTRACT

Described is a system and method for optimizing event predicate processing. The method comprises processing a subscription including a plurality of subscription predicates, sorting the subscription predicates using a predefined sorting algorithm, processing an event including a plurality of event predicates and comparing the plurality of event predicates to the subscription predicates. When each of the subscription predicates is matched by a corresponding one of the event predicates, the event is output to a source of the subscription.

20 Claims, 4 Drawing Sheets

Method 300 for Registering a Subscription

Method 300 for Registering a Subscription

Method 400 for Processing an Event

SYSTEM AND METHOD FOR OPTIMIZING EVENT PREDICATE PROCESSING

PRIORITY CLAIM

The present application claims the benefit of U.S. Provisional Application Ser. No. 60/695,552 entitled "System and Method for Optimizing Event Predicate Processing" filed Jun. 30, 2005, the entire disclosure of which is incorporated herein by reference.

BACKGROUND

A typical system for processing event predicates receives a query for an occurrence of one or more predicates (e.g., a stock symbol and a predetermined price) within an event output by a data source (e.g., a publication of stock transactions on the Internet). The system may output a result when a sale of the stock symbol at the predetermined price is identified within the publication of the stock transactions. An occurrence of the predicate may be referred to as an "equals" predicate. The system may further identify a "not-equals" predicate when, for example, the stock symbol is sold at any price except the predetermined price. In the typical system, the predicate, whether equals or not-equals, may be looked up first for occurrences in an equals predicate index, and then a second time for occurrences in a not-equals predicate index.

While the typical system is effective, it generally has a significant short-coming in that the occurrence of each predicate in the query must be analyzed before the system processes a further query. The short-coming becomes noticeable and problematic when the further query includes a further predicate which is the same as the predicate previously analyzed in the query. That is, the system may be analyzing the same predicate more than once because it is included in more than one query. This redundancy increases an event processing time for a processor (and memory used) and, as a result, delays output to a user of the system. The increase in processor time and delay in output may represent significant costs to operators and/or users of the system.

SUMMARY OF THE INVENTION

The present invention relates to a system and method for optimizing event predicate processing. The method comprises processing a subscription including a plurality of subscription predicates, sorting the subscription predicates using a predefined sorting algorithm, processing an event including a plurality of event predicates and comparing the plurality of event predicates to the subscription predicates. When each of the subscription predicates is matched by a corresponding one of the event predicates, the event is output to a source of the subscription.

DETAILED DESCRIPTION

Figure 1:
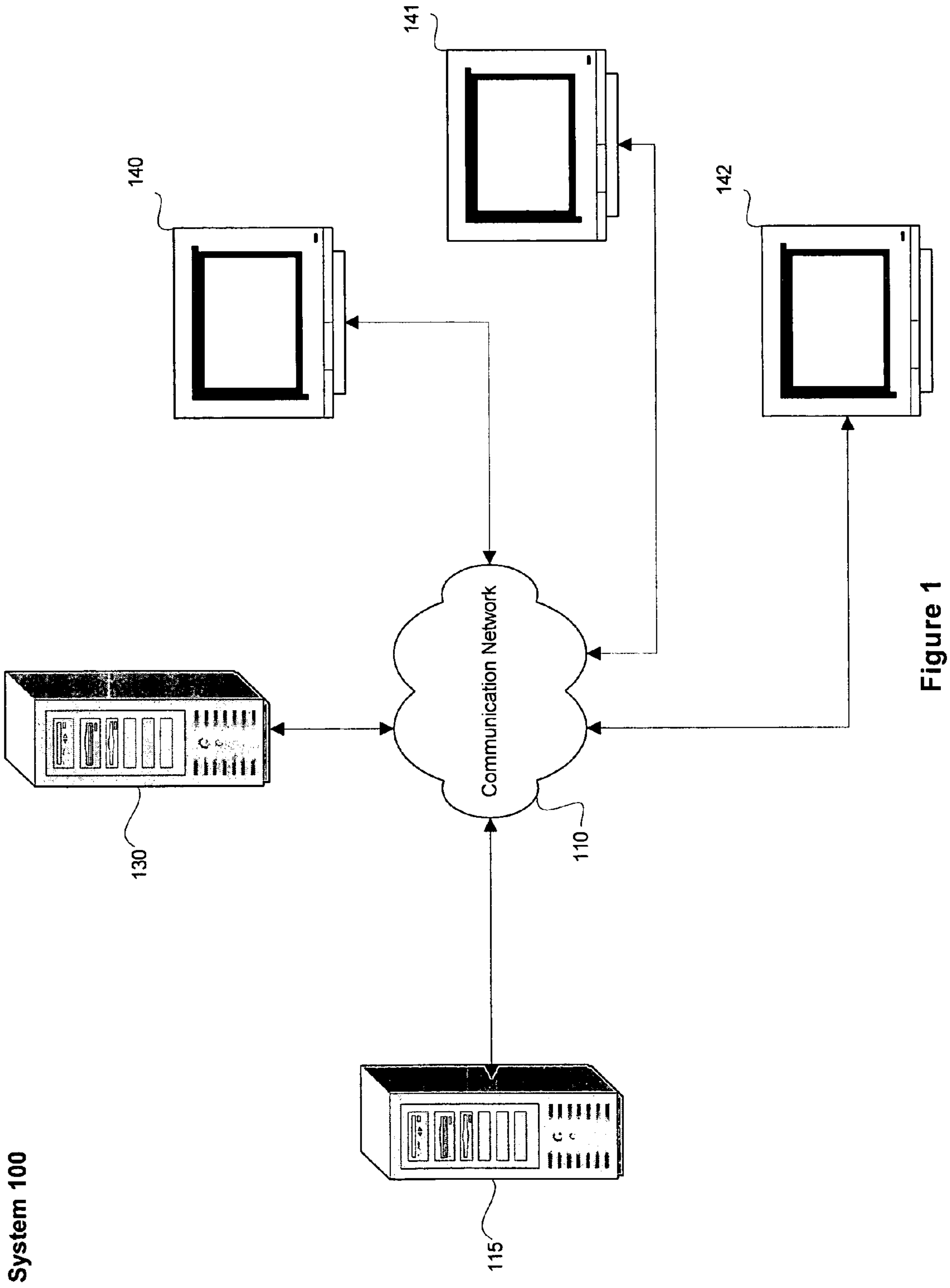
FIG. 1 shows an exemplary system according to the present invention.

The present invention may be further understood with reference to the following description and the appended drawings, wherein like elements are provided with the same reference numerals. The present invention describes a system (e.g., a publish-subscribe system) and method for optimizing the processing of existing and real-time information. In particular, the present invention is useful for processing information generated (e.g., published) asynchronously from creation of a query. The present invention further provides an improvement to existing methods including, for example, solutions to the problems discussed above (i.e., a total processing time of queries).

FIG. 1 shows an exemplary system 100 according to the present invention. The system 100 includes a communication network 110 (e.g., an intranet, a wired/wireless local/wide area network, and/or the Internet). The communication network 110 may be in communication with a server 115 which may include a processor (not shown) and at least one software server 120 (shown in FIG. 2). At least one data provider 130 (e.g., publisher) may be coupled to the communications network 110. The system 100 may further include any number of users (e.g., users 140-142) having access to the server 115 and the data provider 130 via the communication network 110.

Figure 2:
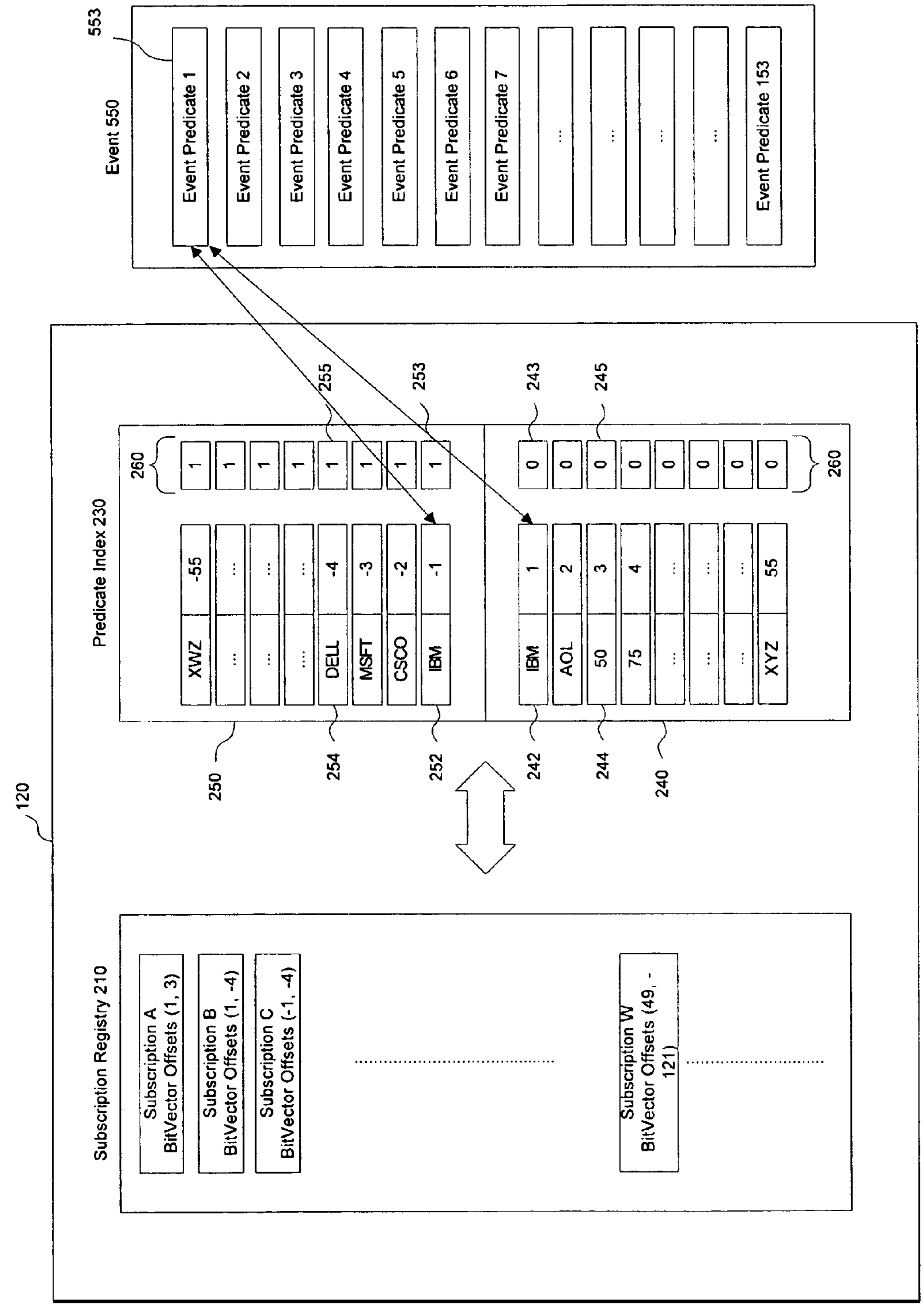
FIG. 2 shows an exemplary embodiment of a software server according to the present invention.

FIG. 2 shows an exemplary embodiment of the software server 120. In this embodiment, the software server 120 may include a subscription registry 210 and a predicate index 230. The predicate index 230 may include a plurality of subindexes including, for example, an equals predicate index 240 and a not-equals predicate index 250. The predicate index 230 may further include a BitVector 260 which includes a bit value for each subscription predicate in the equals and not-equals predicate indices 240 and 250.

Figure 3:
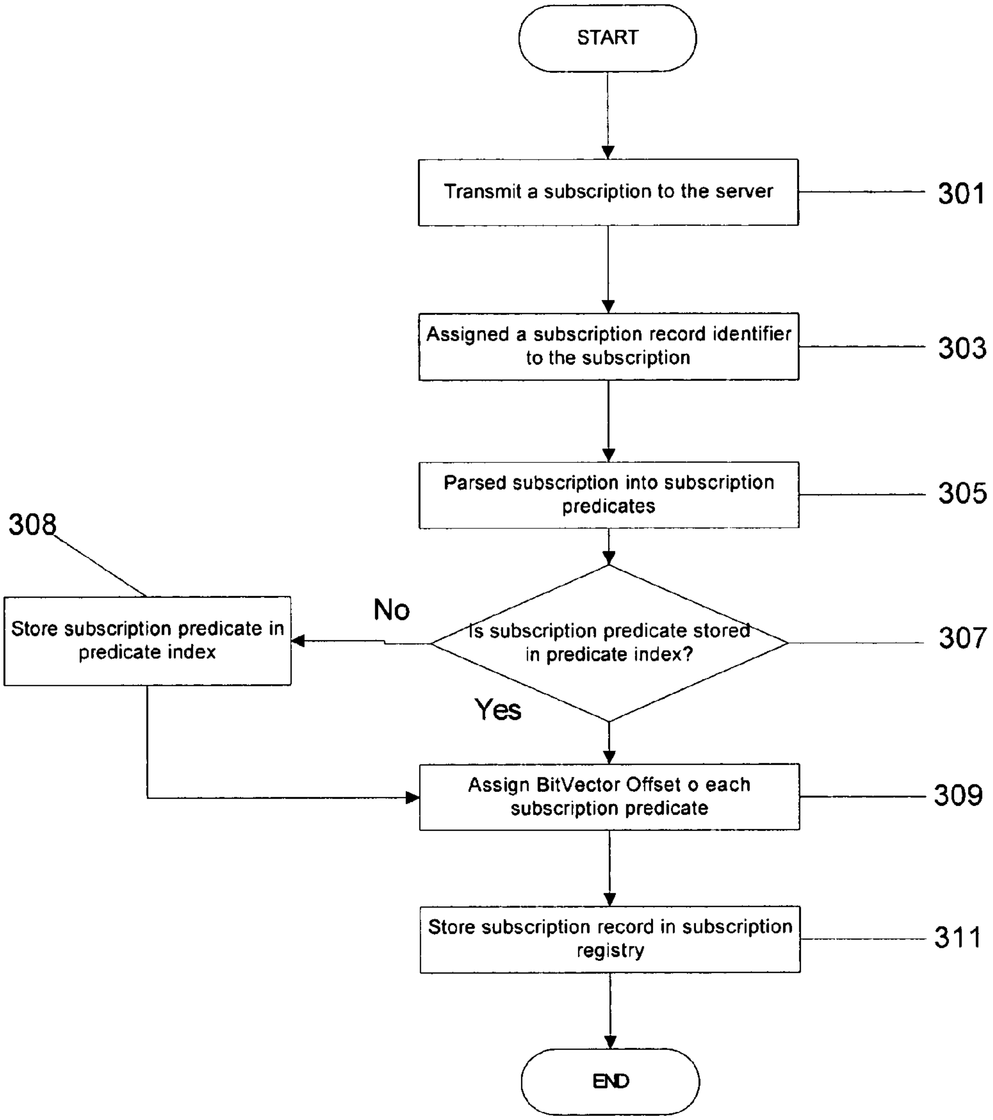
FIG. 3 shows an exemplary method for registering a subscription according to the present invention.

FIG. 3 shows an exemplary method 300 for registering a subscription according to the present invention. The method 300 is described with reference to the system 100 shown in FIG. 1, and the exemplary embodiment of the software server 120 shown in FIG. 2. However, those skilled in the art will understand that other systems having varying configurations may also be used to implement the exemplary method.

In step 301, a user (e.g., the user 140) creates a query (e.g., a subscription) to receive information from the data provider 130. In one embodiment, the data provider 130 publishes realtime information (e.g., stock transactions) which is available to the server 115, the users 140-142 and/or any other device/application with access to the communications network 110. The subscription may be transmitted to the server 115 (and/or the software server 120) via the communications network 110. For example, the user 140 may enter the subscription including one or more subscription predicates, such as stock symbols (e.g., IBM, DELL) and stock prices. Each subscription predicate may be identified as an equals predicate or a not-equals predicate. For example, the subscription may request to receive an occurrence of the stock symbol IBM at a stock price of $50 (i.e., two equals predicates: Symbol=IBM, Price=50). Thus, the user 140 may receive output regarding each sale/purchase of IBM stock at $50. Also, the user 141 may create a further subscription for the occurrences of the stock symbol IBM and non-occurrences of the stock symbol DELL (i.e., the equals predicate and the not-equals predicate: Symbol=IBM, Symbol!=DELL).

In step 303, the subscription is assigned a unique subscription identifier. For example, the software server 120 may assign a subscription identifier "A" (i.e., Subscription A) to the IBM at $50 subscription and a subscription identifier "B" (i.e., Subscription B) to the "IBM, but not DELL."

In step 305, the subscription is parsed to identify the subscription predicate(s) which comprise the subscription. For example, the Subscription A may be parsed into a first subscription predicate 242 (e.g., "Symbol=IBM") and a second subscription predicate 244 (e.g., "Price=50"). In this embodiment, both the first and second subscription predicates 242, 244 are the equals predicates. However, those of skill in the art will understand that the subscription may include any number and/or type of subscription predicates.

In step 307, it is determined whether the first and second subscription predicates 242, 244 are stored in the predicate index 230. That is, the first and second predicates may be duplicates of previously stored subscription predicates. For example, if the Subscription B (e.g., IBM and not DELL) is parsed after the Subscription A (e.g., IBM at $50), the subscription predicate "Symbol=IBM" in the Subscription B may not be stored in the predicate index 230, because it would be a duplicate of the first subscription predicate 242 of the Subscription A. Those of skill in the art would understand that storing duplicates of the previously stored predicates would disadvantageously increase a total processing time of the subscription(s), as will be described below. If the first and/or second subscription predicates 242, 244 are not included in the predicate index 230, a new entry may be created therein, as seen in step 308.

In step 309, a unique value (e.g., a "BitVector Offset") may be assigned to each subscription predicate stored in the predicate index 230. The BitVector Offset is an offset for the bit value in the BitVector 260 which corresponds to the subscription predicate. For example, the first subscription predicate 242 ("Symbol=IBM") is assigned the BitVector Offset of 1 in the equals predicate index 250, and a subscription predicate 254 (e.g., "Symbol!=DELL") is assigned the BitVector Offset of −4 in the not-equals predicate index 240. Those of skill in the art will understand that, if at the time that the subscription predicate 254 is being inserted into the predicate index 260 and a last-inserted predicate index has already had the −3 assigned thereto, the BitVector Offset assigned to the subscription predicate 254 may be "−4."

In one embodiment, the BitVector Offsets assigned to the subscription predicates in the equals predicate index 240 are positive integers, and the BitVector Offsets assigned to the subscription predicates in the not-equals predicate index 250 are negative integers. According to the present invention, the BitVector Offsets of the equals and not-equals predicate indices 240, 250 allow for use of a bulk bit-setting operation. For example, prior to event processing, as will be described below, each bit value in the BitVector 260 which corresponds to the equals predicate index 240 may be set to a first predetermined value (e.g., "0"), whereas each bit value in the BitVector 260 corresponding to the not-equals predicate index 250 may be set to a second predetermined value (e.g., "1").

In step 311, a subscription record for the subscription is generated and stored in the subscription registry 210. The subscription record may include the subscription identifier and the BitVector Offset(s) for the subscription predicate(s) included in the subscription. For example, the subscription record for IBM at $50 subscription includes the Subscription identifier A and the BitVector Offsets 1 and 3, which correspond to the first and second subscription predicates 242, 244, respectively, in the equals predicate index 240.

Figure 4:
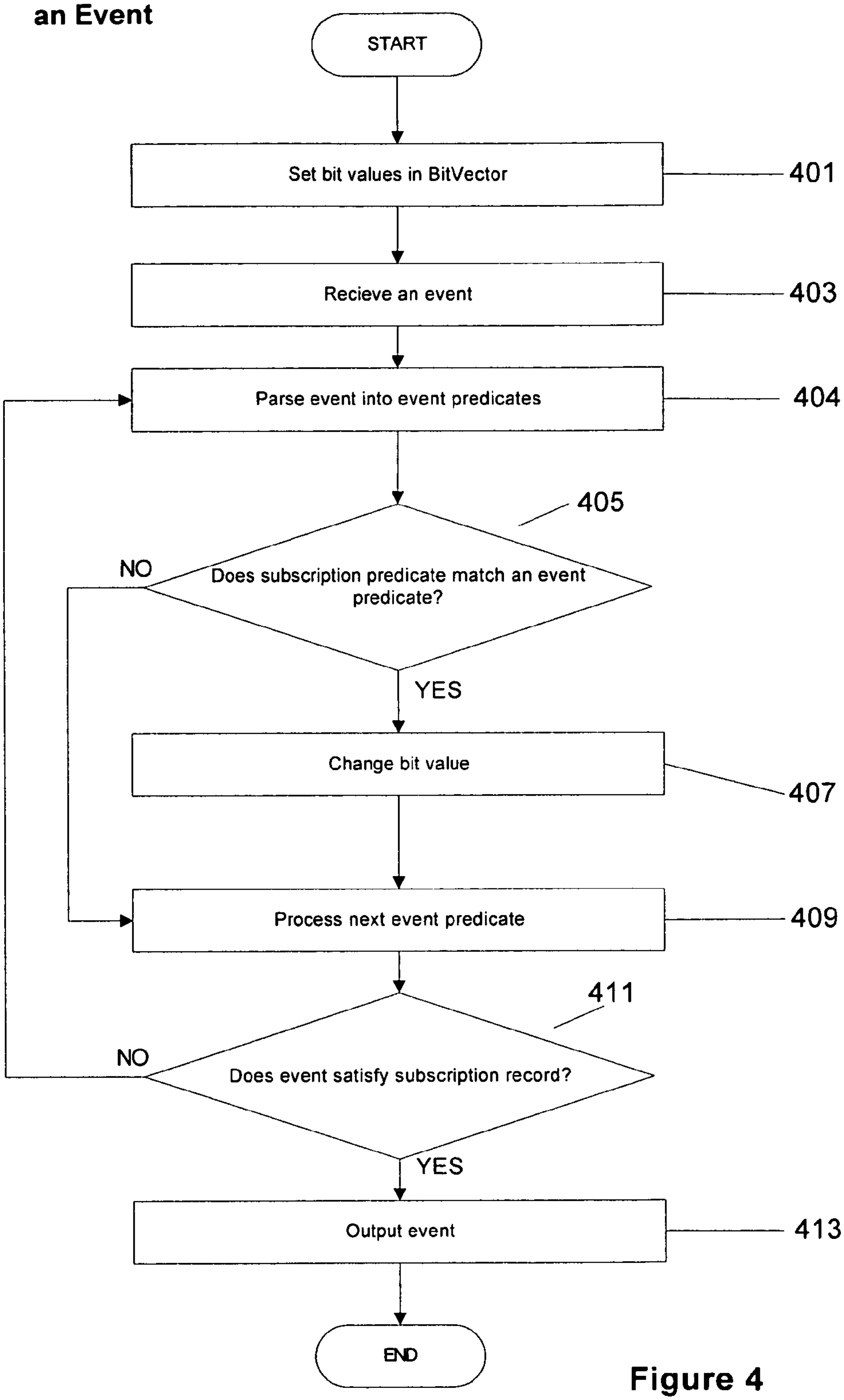
FIG. 4 shows an exemplary method for processing an event according to the present invention.

FIG. 4 shows an exemplary method 400 for processing an event 550 according to the present invention. In one embodiment, the event 550 is a publication of a stock transaction by the data provider 130. The software server 120 may receive the event 550 via a direct connection to the data provider 130 and/or may receive the publication via the communication network 110. The method 400 will be described with reference to the system 100 shown in FIG. 1 and the software server 120 shown in FIG. 2. However, those skilled in the art will understand that other systems having varying configurations may also be used to implement the exemplary method.

In step 401, the bit values in the BitVector 260 which correspond to the subscription predicates in the equals predicate index 240 are set to "0" or false, and the bit values corresponding to the subscription predicates in the not-equals predicate index 250 are set to "1" or true. As described above, this may be accomplished utilizing the bulk bit-setting operation on the BitVector 260. As shown in FIG. 2, a bit value 243 corresponding to the first subscription predicate 242 is set to 0, whereas a bit value 255 corresponding to the subscription predicate 254 is set to 1.

In step 403, the software server 120 receives the event 550 from the data provider 130 and/or the communication network 110. The event 550 may be any publication and/or data (e.g., a document, a file, a data stream, a database, etc.). As understood by those of skill in the art, the software server 120 may receive events from any number of data providers. As shown in FIG. 2, a single event may include one or more event predicates. For example, the event 550 includes 153 separate event predicates.

In step 404, the event 550 is parsed to extract the event predicates contained therein. For example, the event 550 may include a sale of IBM stock, and, as such, may include an event predicate 553, "Symbol=IBM." As understood by those of skill in the art, the event predicates within each event may be processed in parallel or in series.

In step 405, the software server 120 determines whether the event predicate 553 matches any subscription predicate in the predicate index 230. For example, when the event predicate 553 is the "Symbol=IBM," a search of the predicate index 230 yields the first subscription predicate 242. Also, as shown in FIG. 2, a subscription predicate 252 from a further subscription (e.g., Subscription C) is located which corresponds to a not-equals predicate (e.g., Symbol!=IBM). Thus, the search of the predicate index 240 may return two matches, the first subscription predicate 242 and the subscription predicate 252. That is, in one embodiment, each event predicate may be matched to at most two subscription predicates, the equals predicate and the not-equals predicate.

In step 407, the bit value 243 in the BitVector 260 corresponding to the first subscription predicate 242 is changed to "1" or "true." Similarly, a bit value 253 in the BitVector 260 corresponding to the further subscription predicate 252 is set to "0" or "false."

In step 409, the event predicate 553 was not matched to any subscription predicate or the bit value of the matching subscription predicate was changed, so the next event predicate in the event 550 is processed. Those of skill in the art will understand that steps 405-409 may be repeated for each event predicate (e.g., event predicates 1-153) in the event 550. After all of the event predicates in the event 550 are processed, a modified BitVector 260 is generated which corresponds to the event 550.

In step 411, it is determined whether the event 550 satisfies any of the subscription records. In one embodiment, each subscription record in the subscription registry 210 is compared to the predicate index 230 and the modified BitVector 260. For example, the Subscription A contains the BitVector Offsets 1 and 3 which correspond to the first subscription predicate 242 (e.g., Symbol=IBM) and the second subscription predicate 244 (e.g., Price=50). The event 550 may be considered a match if the bit value in the modified BitVector 260 for each of the first and second subscription predicates 242 and 244 has changed to "1" or "true." If all of the subscription predicates in the subscription record are matched, the event 550 is outputted to the user (step 413). If the subscription record is not matched, a next event is processed (back to step 403).

According to another embodiment of the present invention, the subscription record may only be processed for as long as it is satisfied. For example, the event 550 includes the event predicate 553 which corresponds to the BitVector Offset 1 included in the Subscription A. However, if the event 550 did not include an event predicate which corresponded to the BitVector Offset 1, it may be determined that the event 550 does not match the Subscription A. That is, the BitVector Offset 3 would not have to be considered, because whether an event predicate is a match is irrelevant without a match for the BitVector Offset 1.

In a further embodiment of the present invention, the software server 120 may execute a sorting algorithm whereby it reorders the BitVector Offsets in each subscription record as a function of a likelihood that the bit value will not be changed (e.g., a bit selectivity). For example, the Subscription B includes the equals predicate (e.g., the BitVector Offset 1) and the non-equals predicate (e.g., the BitVector Offset −4). Initially, the sorting algorithm may indicate that any BitVector Offset corresponding to an equals predicate should be checked first. That is, in the Subscription B, the BitVector Offset 1 would be checked prior to the BitVector Offset −4, because it may be more likely that the event 550 will not include the Symbol=IBM than the Symbol!=DELL. However, as the software server 120 processes events, it may record a change frequency for one or more bit values in the BitVector 260. Thus, the BitVector Offsets in each subscription record in the subscription registry 210 may be reordered beginning with the bit value with a lowest change frequency. Thus, for each subscription record, if that bit value is not changed, the event does not match the subscription record, and a next subscription record may be analyzed. The software server 120 may track the change frequency of the bit values to optimize the reordering of the BitVector Offsets during operation.

In yet a further embodiment, the software server 120 may execute a grouping algorithm so that the subscription records which share a common BitVector Offset may be formed into a group. For example, the Subscription A and the Subscription B both include the BitVector Offset 1, and may be included in the group. Thus, if the bit value 243 has not been changed by the event 550, processing of the group may cease, and another group may be analyzed. This embodiment may also utilize the change frequency. That is, the common BitVector Offset may be selected as a function of the change frequency. For example, the BitVector Offset with the lowest change frequency may be utilized as a basis for forming the group. Those of skill in the art will understand that randomly selecting the common BitVector Offset may not decrease processing time, because if that common BitVector Offset has a high change frequency, the bit value corresponding thereto may have been changed by the event 550, and, as such, another BitVector Offset in each subscription record would have to be checked. As described above with respect to the sorting algorithm, the grouping algorithm may be executed as the change frequencies for the bit values are increased and/or decreased.

In another embodiment of the present invention, the sorting algorithm may be utilized in conjunction with the grouping algorithm. For example, the software server 120 may utilize the change frequency to reorder the BitVector Offsets in each subscription record and group the subscription records based on the reordering. Those of skill in the art will understand that in addition to or in place of the change frequency, the software server 120 may utilize further heuristic rules/categories and/or internal and external factors to optimize the subscription processing. For example, the software server 120 may reorder the BitVector Offsets to ensure that the BitVector Offset corresponding to the bit value with the lowest change frequency may be analyzed first. However, a processor and/or a memory space utilized to analyze that BitVector Offset may be higher than if another BitVector Offset corresponding to another bit value with a second lowest change frequency was analyzed first. In this manner, the software server 120 may optimize the processor and/or memory space used when comparing the subscription records to the BitVector.

In the preceding description, the present invention has been described with reference to specific exemplary embodiments thereof. It will, however, be evident that various modifications and changes may be made thereunto without departing from the broadest spirit and scope of the present invention.

What is claimed is:

1. A method, comprising:
- processing a subscription including a plurality of subscription predicates;
- sorting the subscription predicates using a predefined sorting algorithm;
- processing an event including a plurality of event predicates;
- comparing the plurality of event predicates to the subscription predicates; and
- when each of the subscription predicates is matched by a corresponding one of the event predicates, outputting the event to a source of the subscription, wherein the sorting includes reordering bit vector offsets in each subscription as a function of a likelihood that a bit value of at least one of the bit vector offsets will not be changed.

2. The method according to claim 1, wherein the processing the subscription step includes the following substeps: receiving the subscription; and identifying the plurality of subscription predicates within the subscription.

3. The method according to claim 1, wherein the processing the event step includes the following substeps: receiving the event; and identifying the plurality of event predicates within the event.

4. The method according to claim 1, wherein the sorting step includes the following substeps: identifying each of the subscription predicates as one of an equals subscription predicate and a not-equals subscription predicate; and re-ordering the subscription predicates so that the equals subscription predicate is compared to the plurality of event predicates before the not-equals subscription predicate.

5. The method according to claim 1, wherein the sorting step includes the following substeps: determining, for each of the subscription predicates, a probability that it will be matched by the corresponding one of the event predicates; and re-ordering the subscription predicates as a function of the probability.

6. The method according to claim 5, further comprising: comparing the subscription predicates, in order from a lowest probability to a highest probability, to the plurality of event predicates.

7. A method, comprising:
- processing a plurality of subscriptions, each of the subscriptions including a plurality of subscription predicates;
- generating groups of the subscriptions, each of the groups having at least one common subscription predicate;
- processing an event including a plurality of event predicates;

comparing the plurality of event predicates to the at least one common subscription predicate for each of the groups; and when the at least one common subscription predicate is matched by a corresponding one of the event predicates, comparing the plurality of event predicates to remaining subscription predicates of each of the subscriptions in the group, wherein subscriptions that share a common bit vector offset are formed into a group.

8. The method according to claim 7, further comprising: when the remaining subscription predicates of the subscription are matched by a corresponding one of the event predicates, outputting the event to a source of the subscription.

9. The method according to claim 7, further comprising: sorting the subscription predicates in each subscription using a predefined sorting algorithm.

10. The method according to claim 9, wherein the sorting step includes the following substeps: identifying each of the subscription predicates in each of the groups as one of an equals subscription predicate and a not-equals subscription predicate; and re-ordering the subscription predicates in each of the groups so that the equals subscription predicate is compared to the plurality of event predicates before the not-equals subscription predicate.

11. The method according to claim 9, wherein the sorting step includes the following substeps: determining, for each of the subscription predicates in each of the groups, a probability that the subscription predicate will be matched by the corresponding one of the event predicates; and re-ordering the subscription predicates in each of the groups as a function of the probability.

12. The method according to claim 11, further comprising: comparing the subscription predicates, in order from a lowest probability to a highest probability, to the plurality of event predicates.

13. The method according to claim 7, wherein the processing the subscription step includes the following substeps: receiving the subscription; and identifying the plurality of subscription predicates within the subscription.

14. The method according to claim 7, wherein the processing the event step includes the following substeps: receiving the event; and identifying the plurality of event predicates within the event.

15. A device, comprising:

a memory storing a plurality of subscriptions, each of the subscriptions including a plurality of subscription predicates; and a processor generating groups of the subscriptions, each of the groups having at least one common subscription predicate, the processor processing an event including a plurality of event predicates, the processor comparing the plurality of event predicates to the at least one common subscription predicate for each of the groups, wherein, when the at least one common subscription predicate is matched by a corresponding one of the event predicates, the processor compares the plurality of event predicates to remaining subscription predicates of each of the subscriptions in the group, the processor forming subscriptions that share a common bit vector offset into a group.

16. The device according to claim 15, wherein, when the remaining subscription predicates of the subscription are matched by a corresponding one of the event predicates, the processor outputs the event to a source of the subscription.

17. The device according to claim 15, wherein the processor identifies each of the subscription predicates in each of the groups as one of an equals subscription predicate and a not-equals subscription predicate and re-orders the subscription predicates in each of the groups so that the equals subscription predicate is compared to the plurality of event predicates before the not-equals subscription predicate.

18. The device according to claim 15, wherein the processor determines, for each of the subscription predicates in each of the groups, a probability that the subscription predicate will be matched by the corresponding one of the event predicates and re-orders the subscription predicates in each of the groups as a function of the probability.

19. The device according to claim 18, wherein the processor compares the subscription predicates, in order from a lowest probability to a highest probability, to the plurality of event predicates.

20. The device according to claim 15, further comprising: a communications arrangement receiving the event.

* * * * *